Dec. 29, 1970   D. C. GILKESON ET AL   3,551,030
OBJECTIVE LENS FOR MICROFILM CAMERA
Filed May 20, 1969
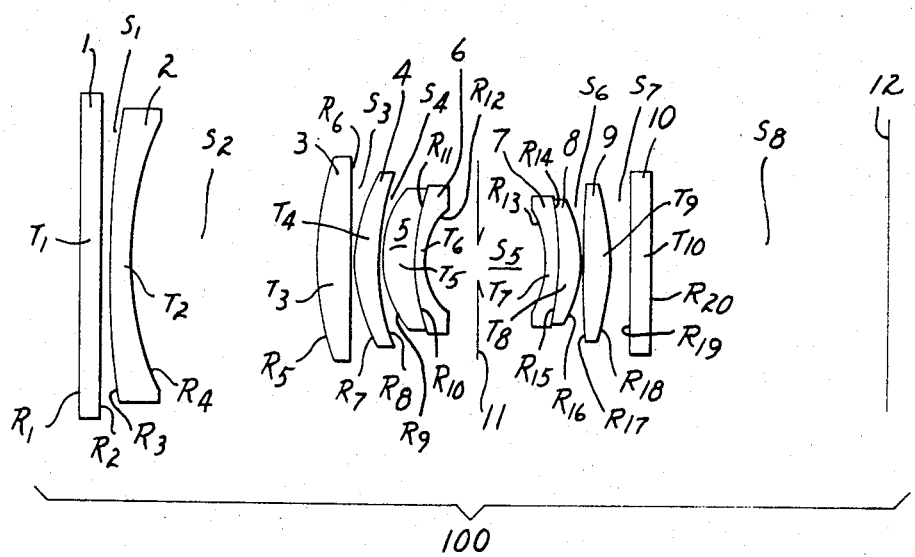
INVENTORS
MICHAEL JOHN BUZAWA
DAVID C. GILKESON
BY Kinney, Alexander,
Sell, Steldt & DeLaHunt
ATTORNEYS

United States Patent Office 3,551,030
Patented Dec. 29, 1970

3,551,030
OBJECTIVE LENS FOR MICROFILM CAMERA
David C. Gilkeson, White Bear Lake, Minn., and Michael J. Buzawa, Rochester, N.Y., assignors to Minnesota Mining and Manufacturing Company, St. Paul, Minn., a corporation of Delaware
Filed May 20, 1969, Ser. No. 826,105
Int. Cl. G02b 9/64, 13/24
U.S. Cl. 350—196　　　　　　　　　　　　　2 Claims

ABSTRACT OF THE DISCLOSURE

A microfilm camera/processor having a constant film plane to copyboard distance and a plurality of objective lens systems mounted in a precision turret for alternative utilization to vary the magnification or reduction of the camera/processor. This particular system comprises a ten element microphotographic objective lens for providing a given magnification of 30× in a fixed copyboard to film distance of 82 inches.

BACKGROUND OF THE INVENTION

There have been different types of microfilm cameras on the market to date, varying from low to high resolution. Generally the highest resolution cameras have been large and expensive planetary cameras affording various reductions by tedious and exact settings by specially trained operating personnel. The other types of microfilm cameras were fixed reduction cameras usually called rotary cameras and were of lower resolution capability. A camera providing the high resolution and variable reduction performance of the planetary cameras while maintaining the ease of operation of the fixed camera would be a significant contribution to the development of the art.

SUMMARY OF THE INVENTION

This invention provides an improved design for an objective lens system, having particular utility in a microfilm camera/processor. The lens system provides a high resolution, high precision lens design within a fixed copyboard to film distance.

It is an object of the present invention to provide a ten element objective lens system for use with a closed film chamber, having a fixed copyboard to film plane distance of 82 inches.

The microphotographic objective lens includes ten elements numbered consecutively from object toward the image, front to rear, the first element being a filter, the second lens element being air spaced from said first lens element and being a negative meniscus lens, the third element being a plano convex positive lens, the fourth element being a positive meniscus lens, the fifth element being a positive meniscus and the sixth element being a negative meniscus where said elements five and six are cemented together to form a negative doublet, the seventh element is a negative meniscus lens and the eighth element is a positive meniscus lens where said elements seven and eight are cemented together to form a second negative doublet, the ninth element is a bi-convex lens, and the tenth element being a spaced transparent glass plate for sealing the film chamber and being an integral part of the optical system.

The drawing comprises a diagrammatic view of a microphotographic objective lens constructed in accordance with the present invention.

Referring to the drawing, the entire ten element lens system is designated by the reference numeral 100, and the individual elements disclosed in the drawing are numbered from one to ten, consecutively from front to rear, and the reference numeral 12 indicates the image plane for the film. The element 11 refers to the diaphragm or stop which is positioned generally in the center of the lens assembly.

Element 1 is a filter which would be mounted within the lens and spaced a fixed distance from the object plane in the camera arrangement. Air spaced from element 1 is element 2 which is a negative meniscus lens, air spaced therefrom is element 3 which is a plano convex positive lens, the fourth element being a positive meniscus lens, the fifth element being a positive meniscus and the sixth element being a negative meniscus where said elements five and six are cemented together to form a negative doublet, the seventh element is a negative meniscus lens and the eighth element is a positive meniscus lens where said elements seven and eight are cemented together to form a second negative doublet, the ninth element is a bi-convex lens, and the tenth element is a glass plate forming the window for a sealed film chamber.

The radii of curvature R of the lens surfaces, the axial thickness T of the lens elements, and the axial air spacings S, are all expressed in the customary manner with the usual numerals indicating the particular surface, lens thickness, or air space, numbered in sequence from front to rear.

Table I which is an example of the lens having an effective focal length of 65 mm., the relative aperture of F/6.0, can be utilized to produce a 30× reduction in a fixed copyboard to film distance of 82 inches. In Table I, as in the following tables, the dimensions are given in millimeters and the plus and minus values of the radii R indicate surfaces respectively convex and concave toward the front. The usual tabular columns provide information concerning the refractive indices N for the D line of sodium, the ABBE dispersive indices V, the radii, lens thickness and air spacings.

spatial relationship to each other are substantially in the proportions indicated by the data in the following table:

TABLE I

[E.F. 65 mm.]

| Element | $N_D$ | V | Radius, mm. | Thickness and spacing, mm. |
|---|---|---|---|---|
| 1 | Schott | GG-395 | $R_1=\infty$ | $T_1=4.0\pm.2$ |
|  |  |  | $R_2=\infty$ | $S_1=2.0\pm1.0$ |
| 2 | 1.5891 | 61.24 | $R_3=+238.0$ | $T_2=4.00\pm.07$ |
|  |  |  | $R_4=+65.61$ | $S_2=36.000\pm.075$ |
| 3 | 1.5891 | 61.24 | $R_5=+58.0$ | $T_3=6.50\pm.07$ |
|  |  |  | $R_6=\infty$ | $S_3=.200\pm.025$ |
| 4 | 1.5169 | 64.2 | $R_7=+29.60$ | $T_4=5.00\pm.07$ |
|  |  |  | $R_8=+49.65$ | $S_4=.200\pm.025$ |
| 5 | 1.6591 | 50.88 | $R_9=+21.20$ | $T_5=7.094\pm.070$ |
| 6 | 1.6722 | 32.2 | $R_{10}=+40.25$ $R_{11}=+40.25$ |  |
|  |  |  | $R_{12}=+13.79$ | $T_6=2.00\pm.07$ |
|  |  |  |  | $S_5=23.658$ |
| 7 | 1.6476 | 33.9 | $R_{13}=-19.76$ | $T_7=2.10\pm.07$ |
|  |  |  | $R_{14}=-95.0$ |  |
| 8 | 1.6591 | 50.88 | $R_{15}=-95.0$ |  |
|  |  |  | $R_{16}=-23.20$ | $T_8=4.395\pm.070$ |
|  |  |  |  | $S_6=.200\pm.025$ |
| 9 | 1.5891 | 61.24 | $R_{17}=+731.0$ | $T_9=5.20\pm.07$ |
|  |  |  | $R_{18}=-52.50$ | $S_7=3.775$ |
| 10 | 1.5224 | 59.48 | $R_{19}=\infty$ | $T_{10}=3.81\pm.10$ |
|  |  |  | $R_{20}=\infty$ | $S_8=36.5$ to image plane. | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by a subscript numeral used with each R, mating cemented surfaces being counted as a single surface in numbering them, plus and minus values of R indicating surfaces which are respectively convex and concave toward the front of the lens, the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 65 millimeters.

What is claimed is:

1. A microfilm camera objective lens for providing reduced sized images onto microfilm from an object on an object plane, said lens comprising ten elements and numbered from object to image, the first element being a filter, the second lens element being air spaced from said first lens element and being a negative meniscus lens, the third element being a plano convex positive lens, the fourth element being a positive meniscus lens, the fifth element being a positive meniscus and the sixth element being a negative meniscus where said elements five and six are cemented together to form a negative doublet, the seventh element is a negative meniscus lens and the eighth element is a positive meniscus lens where said elements seven and eight are cemented together to form a second negative doublet, the ninth element is a bi-convex lens, and the tenth element is a glass plate forming the window for a sealed film chamber.

2. A microfilm projection lens according to claim 1 wherein the characteristics of the ten elements and their

References Cited

UNITED STATES PATENTS 3,348,896 10/1967 Betensky _____ 350—215X

JOHN K. CORBIN, Primary Examiner

U.S. Cl. X.R.

350—214, 215